United States Patent
Boguraev et al.

(10) Patent No.: US 7,389,299 B2
(45) Date of Patent: Jun. 17, 2008

(54) DOCUMENT CONTENT ANALYSIS TECHNOLOGY FOR REDUCING COGNITIVE LOAD

(75) Inventors: Branimir Konstantinov Boguraev, Bedford, NY (US); Jani Gabriel Byrne, Cary, NC (US); Catherine Keefauver Laws, Austin, TX (US); Robert Bruce Mahaffey, Austin, TX (US); Mary Susan Neff, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/932,725

(22) Filed: Sep. 2, 2004

(65) Prior Publication Data

US 2006/0059420 A1   Mar. 16, 2006

(51) Int. Cl.
    *G06F 17/30*   (2006.01)
(52) U.S. Cl. .......................................... 707/101; 715/500
(58) Field of Classification Search ................. 715/500, 715/526, 531, 532; 707/100, 104.1, 10, 101, 707/102; 704/1, 10
See application file for complete search history.

(56) References Cited

U.S. PATENT DOCUMENTS

| 4,358,824 | A | 11/1982 | Glickman et al. |
| 5,689,716 | A | 11/1997 | Chen |
| 5,778,397 | A | 7/1998 | Kupiec et al. |
| 5,918,236 | A | 6/1999 | Wical |
| 5,937,422 | A | 8/1999 | Nelson et al. |
| 6,128,634 | A | 10/2000 | Golovchinsky et al. |
| 6,185,592 | B1 | 2/2001 | Boguraev et al. |
| 6,289,304 | B1 | 9/2001 | Grefenstette |
| 6,349,316 | B2 | 2/2002 | Fein et al. |
| 6,553,373 | B2 | 4/2003 | Boguraev et al. |
| 6,678,677 | B2 * | 1/2004 | Roux et al. .................... 707/3 |
| 2002/0052901 | A1 | 5/2002 | Guo et al. |
| 2007/0011140 | A1 * | 1/2007 | King et al. .................... 707/3 |

OTHER PUBLICATIONS

Bruniger, Ronald J., Search Request, May 29, 2003, IBM Corporation, Austin, Texas, U.S.A.

Zha, Hongyuan, Annual ACM Conference on Research and Development in Information Retrieval, Citation, 202, pp. 13-120, ACM Press, New York, U.S.A.

Hovy, Eduard and Radev, Dragomir, Using Cohesion and Coherence Models for Text Summarization Technical Report, 1998, pp. 60-67, The American Association for Artificial Intelligence, Menlo Park, CA, U.S.A.

Derwent, Thomson, et al, Search Strategy for AUS8-03-0642, May 15, 2003, IBM Corporation, Austin, Texas, U.S.A.

Guo, Zhi Li and Yang, Li Ping, Automatic Method for Generating Summaries for Text Documents, Sep. 6, 2000, IBM Corporation, Austin, Texas, U.S.A.

* cited by examiner

*Primary Examiner*—Cheryl Lewis
(74) *Attorney, Agent, or Firm*—Carr LLP; Casimer K. Salys

(57) ABSTRACT

The present invention provides for analyzing document content for display with reduced cognitive load, and assists those who are blind, have low vision, or have cognitive problems. This present invention also aids those who prefer to receive condensed information orally. Document content is analyzed, a set of salient words and phrases are generated from the document content, the salient words and phrases are tagged, and the set of salient words and phrases are read.

8 Claims, 4 Drawing Sheets

US 7,389,299 B2

DOCUMENT CONTENT ANALYSIS TECHNOLOGY FOR REDUCING COGNITIVE LOAD

FIELD OF THE INVENTION

The present invention relates generally to accessibility functions for a document on a computer and, more particularly, to a method for analyzing document content that reduces the cognitive load for a user.

BACKGROUND

When reading newspapers, documents, or web pages, there are significant amounts of text in which salient information is imbedded. For people with low vision, dyslexia, blindness, some eye-motor disabilities, and most cognitive deficiencies, text density and organization create challenges. Not only is there a huge cognitive processing demand required, but the individual must parse meaningful information from non-meaningful information without the benefit of additional cueing (e.g., color, chunking, etc). In addition, the blind person using a screen reading device must perform this higher level cognitive function while also listening to the information, making it necessary to retain large quantities of spoken information in working memory buffers to derive the meaning contained within a few key words.

Typical industry solutions to date utilize a document summarizer. Summarization technology addresses the problem of information overload by reducing a full document to a surrogate summary consisting of a few sentences extracted from the document in a way which retains the essence of the document content. Summarization technology addresses technical challenges like coherence, cohesion, and information quotient. However, even though the information reduction it achieves would help a person with cognitive disabilities, summarization does not explicitly address perceptual problems which might require solutions identifying salient text fragments of granularity smaller than a sentence.

In particular, none of the summarization technologies listed above 'tag' words or phrases with a salience measure. Consequently, these technologies are unable to focus on short text fragments; brevity being of the essence from the point of view of a person with cognitive disabilities. Furthermore, not much attention has been paid to contextualizing the salient fragments. Summarization solutions do not, typically, relate a summary to the original document source, which makes it hard to create a cognitive map between the summary and the full text.

Therefore, there is a need for a solution to reduce the heavy cognitive load, addressing at least some of the problems associated with conventional document summarizers.

SUMMARY OF THE INVENTION

The present invention provides for analyzing document content so the content can be displayed with reduced cognitive load. The document content is analyzed and a set of salient words and phrases are generated from the document content. The salient words and phrases are tagged. A marked-up document containing the set of salient words and phrases are then read.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION OF THE INVENTION

The present invention is described to a large extent in this specification in terms of methods and systems for analyzing document content for display with a reduced cognitive load. However, persons skilled in the art will recognize that a system for operating in accordance with the disclosed methods also falls within the scope of the present invention. The system could be carried out by a computer program or parts of different computer programs.

This invention can also be embodied in a computer program product, such as a CD-Rom or other recording medium, for use with any suitable data processing system. Persons skilled in the art would recognize that any computer system having suitable programming means will be capable of executing the steps of the method of the invention as embodied in a program product. Although most of the exemplary embodiments described in this specification are oriented to software installed and executing on computer hardware, persons skilled in the art would recognize alternative embodiments implemented as firmware or as hardware are within the scope of the present invention.

Figure 1:
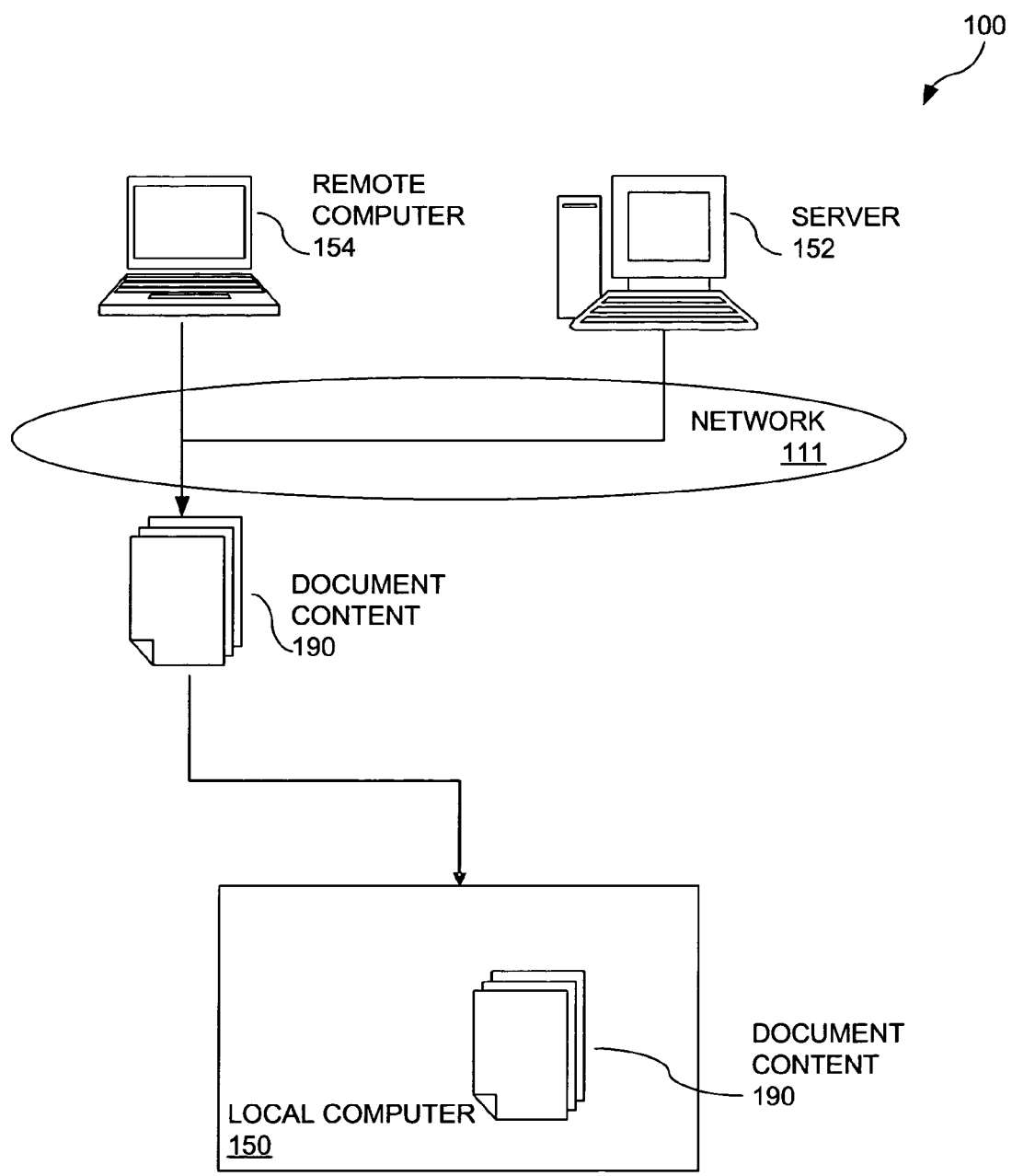
FIG. 1 illustrates a method for analyzing document content and displaying the document content with a reduced cognitive load.

Referring now to FIG. 1, the reference numeral 100 generally indicates a system by which document content can be received. A remote computer 154 or a server 152 connected by a network 111 sends document content 190 to a local computer 150. Also, a local computer can already have access to the document content 190 through internal storage such as a hard drive or RAM, or other stored data such as a CD-Rom.

A "Network" is used in this detailed description to mean one of any networked pairing for data communications among computers or computer systems. Examples of networks include intranets, extranets, internets, local area networks (LAN), wide area networks (WAN), and other network arrangements as would occur to those persons of skill in the art.

Figure 2:
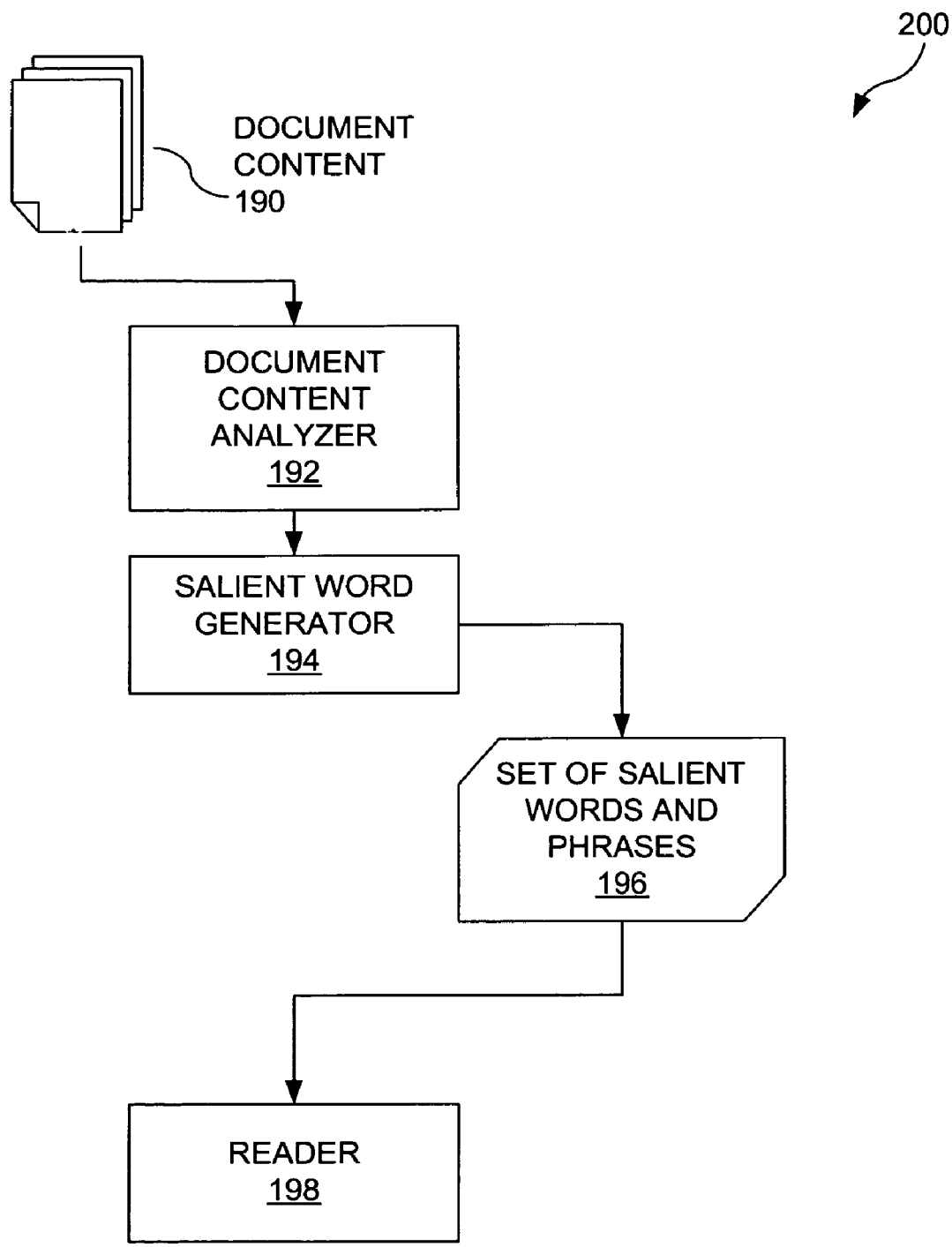
FIG. 2 illustrates a detailed method of analyzing document content.

Referring now to FIG. 2 the reference numeral 200 generally indicates an exemplary system for document content analysis. In the system 200, document content 190 is sent to a document content analyzer 192. After the document content 190 is analyzed by the document content analyzer 192, a salient word generator 194 creates a set of salient words and phrases 196 from the document content 190. The set of salient words and phrases 196 can also be included as part of a larger, salient marked-up document. Although not depicted in the exemplary system 200, a salient word generator can also be included as part of a document content analyzer as would occur to those of skill in the art. A reader 198 capable of reading the set of salient words and phrases 196 can create audible representations by sending the set of salient words and phrases 196 to a text-to-speech engine or display the set of salient words and phrases 196 on a computer screen. The reader 198 not only reads the set of salient words and phrases, but can also read XML tags, HTML, image tags, metatags and so on.

The salient marked-up document not only includes the set of salient words and phrases but can also include images, tables, charts, and etc. The function of the reader 198 reading images can be suppressed by the system 200, or the ALT tags on the images can be read aloud. For example, words in that salient marked-up document underlined by the document content analyzer could be read louder, or HTML links could be read in a different voice. The method of FIG. 1 can read tables, forms, and frames and allows users to search for specific text on a Web page as well as on the entire Web.

Salient, as used in this specification, means prominent and also includes having a quality that thrusts itself into attention. Salience acts as a mediator for the type and quantity of the information reduction over the original document, defined in terms of small, brief, information-bearing chunks. Salient words and phrases are the words and phrases considered by the document content analysis as bearing information.

Document content analysis, in a particular configuration, aims to process a text document, and by means of a pipeline of linguistic processing (interchangeably driven by morpho-syntactic rules and/or statistical models of human language subsystems), it identifies words and phrases which are potential 'bearers' of new information. A morphosyntactic operation is an ordered, dynamic relation between one linguistic form and another.

Figure 3:
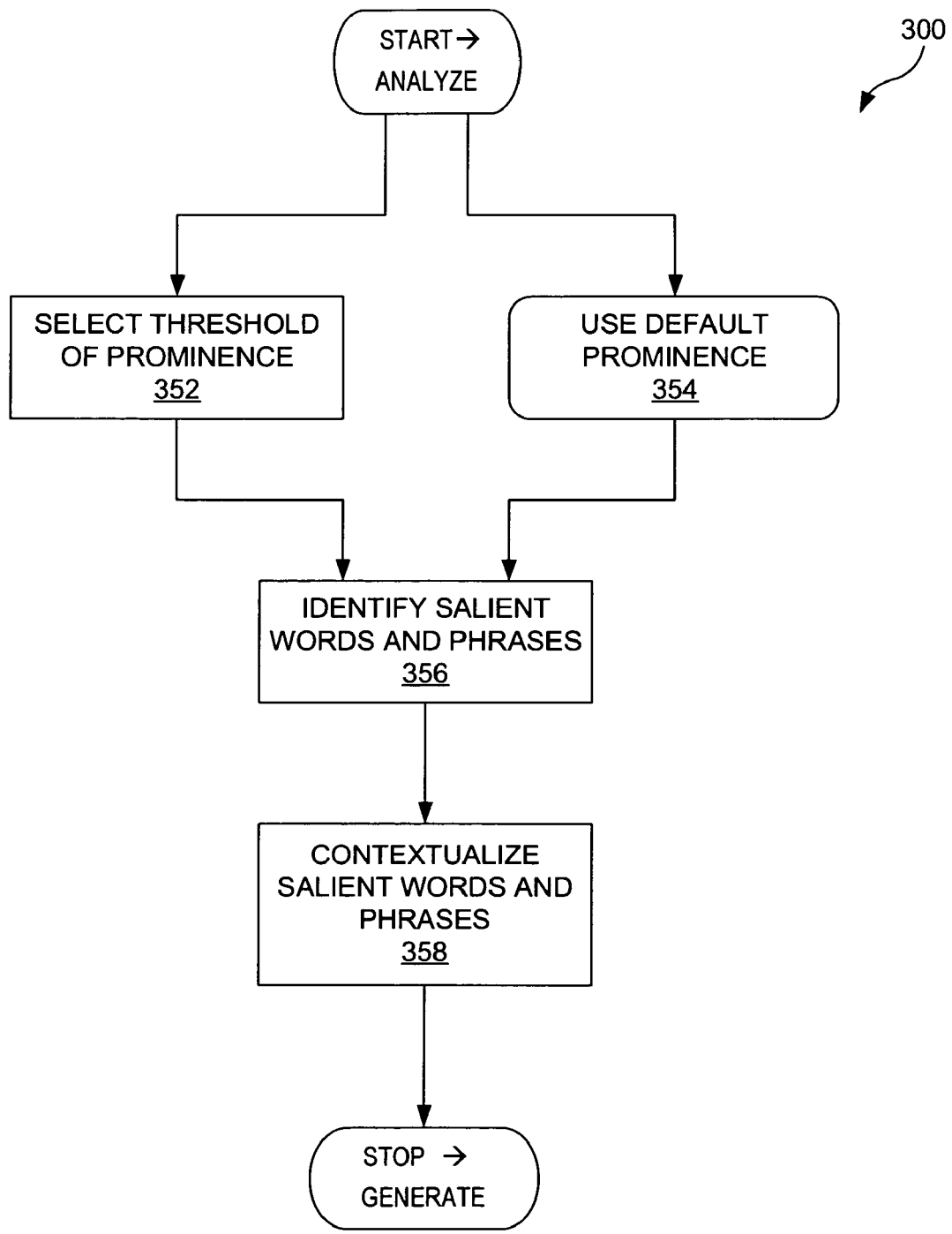
FIG. 3 illustrates a method of generating a set of salient words and phrases.

Turning now to FIG. 3, the reference numeral 300 generally indicates an exemplary method for analyzing document content. The method 300 includes selecting a threshold of prominence 352. Selecting a threshold of prominence 352 is typically carried out by a user at a computer using computer inputs such as a mouse or a keyboard. Alternatively, the method 300 includes using the default prominence 354 settings. Selecting a threshold of prominence includes selecting prominence settings such as those for identifying, word, sentence, and paragraph boundaries.

Document content found to fall below the threshold level of prominence does not have to be literally dropped. The document content that falls below the threshold of prominence can remain in the document and remain unmarked or can be deleted from the document completely.

After either selecting the threshold of prominence 352 or using the default prominence settings 354, the exemplary method 300 includes identifying salient words and phrases 356. Identifying salient words and phrases can be carried out by counting names, or by recognizing domain terms, abbreviations and document tags. Identifying salient words and phrases 356 works best with documents in which the major document structure elements are explicitly indicated. Structural elements include but are not limited to titles, headings, headers, footers, tables, and lists. Identifying salient words and phrases can also be typically carried out by scanning the text for words and phrases that rise above the selected threshold of prominence. The document structural cues are informative of which sentences are salient by virtue of their position and which portions of text should not be considered. For documents without structural cues, the method 300 can also rely on general word statistics, such as word counts, to determine salience.

The method 300 also includes contextualizing salient words and phrases 358. After identifying the salient words and phrases 356, the method 300 contextualizes salient words and phrases to discover whether or not the identified salient words and phrases make sense. Typically, most word processors contain spell checkers that contextualize salient words and phrases and can be modified by those with skill in the art to carry out contextualizing salient words and phrases in the method 300. Contextualizing the salient words and phrases 356 also typically involves arranging the identified salient words and phrases and placing them in a certain context. The method 300 determines which order and sense the set of salient words and phrases belong. After contextualizing the salient words and phrases, the method 300 generates the salient words and phrases.

Generating the salient words and phrases includes tagging the salient words and phrases. Salient words and phrases are tagged before creating the salient marked-up document. Tagging the salient words and phrases is typically done by a form of markup. Markup can be HTML language, highlighting, bold letters, etc., as long as the markup indicates the salient words and phrases of the original document to create a set of salient words and phrases in which the content-bearing items were found. Alternatively, generating the salient words and phrases can also include erasing text determined to be below the level of salience from the document. This is then used by the text markup means to mark up the text accordingly. The salient text can also be highlighted, or marked up in some other way to represent the higher level of prominence.

Figure 4:
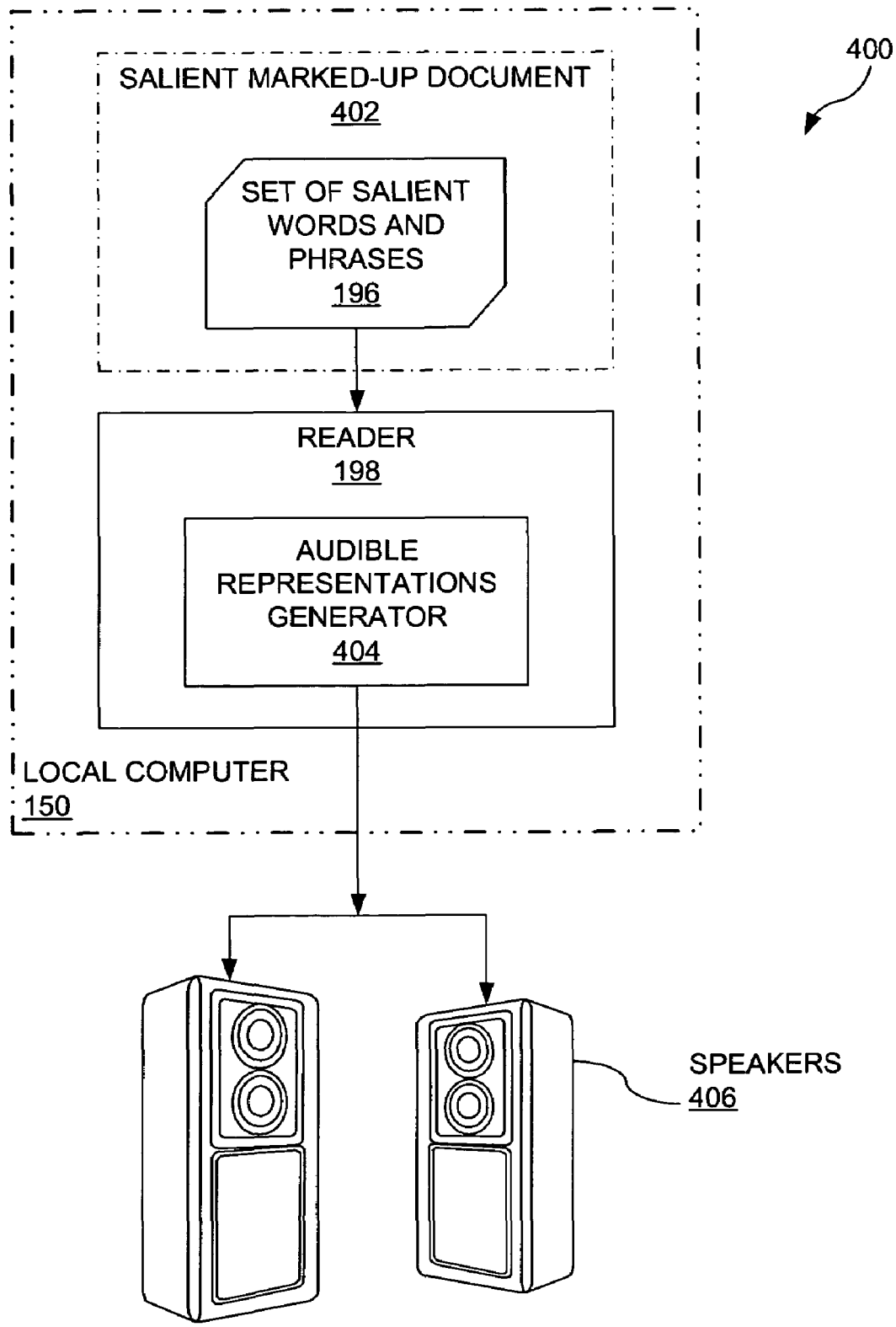
FIG. 4 illustrates a method of reading a salient marked-up document including the salient words and phrases of the salient marked-up document.

Referring now to FIG. 4 the reference numeral 400 generally indicates a system for reading the set of salient words and phrases. Once the set of salient words and phrases 196 has been generated, the set of words and phrases can be sent to a reader 198 individually or as part of a salient marked-up document 402. In the system 400, the reader 198 includes an audible representations generator 404 capable of producing sounds representing the set of salient words and phrases 196 thru a computer 150 to speakers 406. Typical embodiments of an audible representations generator include any text-to-speech converter, such as IBM's text-to-speech engines or Home Page Reader.

The Home Page Reader is an accessibility product, such as an IBM accessibility product, designed to allow people who are blind or have low vision to "read" the web. It utilizes Web Access Technology (WAT) as its engine to navigate an HTML Document Object Model (DOM), such as the Internet Explorer (IE) DOM. WAT generates data packets containing textual content and information about each web page element, which is represented by one or more DOM nodes. A user interface (UI) component, such as the Home Page Reader browser or a document reader, sends requests for specific types of data packets to WAT based on keyboard, mouse, or document events, such as the loading of a web page or the Tab key being pressed. Upon receiving a data packet from WAT, the UI component extracts the text content and information from the packet to generate both text and speech views of the web page. The text view can distinguish different types of elements, such as key words or phrases, using visual text characteristics such as font size, type, color, and style. The speech view uses different speech characteristics, such as speech rate, different voices, sounds files, and leading or trailing text, to differentiate different types or elements on the web page. To generate speech output, the Home Page Reader incorporates an ability that is capable of converting text to audible sounds.

The Home Page Reader can read the text aloud. The way the text is read will vary based on the markups. Images can be suppressed, or the ALT tags on the images could be read aloud. For example, words underlined by the document content analyzer could be read louder, or HTML links could be read in a different voice. Home Page Reader reads the full range of the Web page data in a logical, clear and understandable manner. It reads tables, forms, and frames and allows users to search for specific text on a Web page as well as on the entire Web. In addition, Home Page Reader reads HTML 4.0 information provided by Web page authors, giving information such as table summaries and captions. Home Page Reader reads the full range of the Web page data in a logical, clear and understandable manner.

Not limited to the Home Page Reader, any compatible text-to-speech converter can also be used in the method of analyzing document content for display with reduced cognitive load. To be compatible, a text-to-speech converter must be able to recognize the differences in the text of the marked up document. The method described herein can be embedded in a software product, in which case the software product can mark up the text, and then send it over the internet to a client running a program capable of the Home Page Reader function.

It is understood that the present invention can take many forms and embodiments. Accordingly, several variations can be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention can be employed without a corresponding use of the other features. Many such variations and modifications can be considered desirable by those skilled in the art based upon a review of the foregoing description of preferred embodiments. Accordingly, it is appropriate that the appended claims be construed broadly and in a manner consistent with the scope of the invention.

What is claimed is:

1. A computer implemented method for analyzing document content for display with reduced cognitive load, comprising:
   receiving a document for analysis;
   analyzing document content of the document;
   generating a set of salient words and phrases from the document content based upon the linguistic content of the words and phrases in the document;
   tagging the salient words and phrases in the set of salient words and phrases; and
   reading the set of salient words and phrases.

2. The method of claim 1 further comprising receiving document content over a network.

3. The method of claim 1 further comprising selecting a threshold of prominence for the salient words and phrases.

4. The method of claim 1 wherein analyzing document content further comprises identifying salient words and phrases of the document content.

5. The method of claim 4, further comprising contextualizing the salient words and phrases.

6. The method of claim 1 wherein reading the document content further comprises reading the salient words and phrases.

7. The method of claim 6 wherein reading the salient words and phrases further comprises generating audible representations of the salient words and phrases.

8. The method of claim 6 wherein reading the salient words and phrases further comprises utilizing a Home Page Reader.

\* \* \* \* \*